US008556059B2

(12) United States Patent
Ng et al.

(10) Patent No.: US 8,556,059 B2
(45) Date of Patent: Oct. 15, 2013

(54) ROLLER CLUTCH ASSEMBLY

(76) Inventors: Philip Ng, Thornhill (CA); Norman Wills, Missisauga (CA)

( * ) Notice: Subject to any disclaimer, the term of this patent is extended or adjusted under 35 U.S.C. 154(b) by 635 days.

(21) Appl. No.: 12/748,577

(22) Filed: Mar. 29, 2010

(65) Prior Publication Data

US 2010/0243182 A1 Sep. 30, 2010

Related U.S. Application Data

(60) Provisional application No. 61/164,440, filed on Mar. 29, 2009.

(51) Int. Cl.
*F16D 49/04* (2006.01)
*E06B 9/56* (2006.01)

(52) U.S. Cl.
USPC ....................... 192/223.4; 192/81 C; 160/298

(58) Field of Classification Search
USPC ....................................................... 192/223.4
See application file for complete search history.

(56) References Cited

U.S. PATENT DOCUMENTS 5,507,374 A * 4/1996 Rude ......................... 192/223.4

FOREIGN PATENT DOCUMENTS

JP 62009035 A * 1/1987

* cited by examiner

*Primary Examiner* — David D Le
*Assistant Examiner* — Ryan Dodd
(74) *Attorney, Agent, or Firm* — Elias Borges

(57) ABSTRACT

An improved roller blind clutch assembly is disclosed for controlling the raising and lowering of a roller blind which permits the smooth raising and lowering of roller blinds even if the blinds are heavy. The improved roller blind clutch assembly includes a roller tube mount coaxially and rotatably mounted to a barrel. A clutch member is in turn coaxially and rotatably mounted to the barrel between the roller tube mount and the barrel. The clutch member has a window formed between a first and a second edge of the clutch member. A torsion locking spring is coaxially mounted to the barrel between the barrel and the clutch member. The torsion locking spring has opposite first and second ends which project into the window. The roller tube mount has an extension portion configured to extend into the window and dimensioned to fit between the first and second ends of the torsion locking spring. The extension has opposite first and second shoulders covered by a steel shim configured to fit between the extension and the torsion locking spring. The extension portion is also dimensioned and configured to maintain a gap between the extension and the torsion locking spring; thereby permitting the torsion locking spring from catching on the barrel as the clutch mechanism is used to raise and lower the blind. The extension portion has a concave face with a circular diameter less than the diameter of the torsion locking spring.

4 Claims, 4 Drawing Sheets

ROLLER CLUTCH ASSEMBLY

CROSS REFERENCE TO RELATED APPLICATION

This application claims priority from U.S. Provisional application Ser. No. 61/164,440 filed Mar. 29, 2009, the entirety of which is incorporated herein by reference.

FIELD OF THE INVENTION

The invention relates generally to clutch assemblies for roller blinds.

BACKGROUND OF THE INVENTION

Roller blinds are generally controlled by a roller clutch assembly which is used to manually raise and lower the blind. These clutch assemblies generally consist of a housing having a barrel portion to which a roller tube support member is rotatably mounted. The blind is coupled to a roller tube which is in turn coupled to the roller tube support member. A clutch member is rotatably mounted to the barrel portion of the housing and is coupled to the roller tube support member. A looped chain is in turn coupled to the clutch member to permit the user to rotate the clutch member (and thereby the roller tube) by pulling on the chain. This permits the user to raise and/or lower the blind by simply pulling on the chain to rotate the roller tube in the desired direction. To ensure that the roller tube does not rotate without the chain being engaged, one or more lock springs are provided in the clutch assembly. These lock springs are coaxially mounted to the barrel between the barrel and the clutch member. The lock springs are configured such that engaging the chain causes the clutch member to engage the lock spring so as to slightly increase the diameter of the spring, permitting the clutch to rotate freely. The lock spring is further configured such that rotating the roller tube support alone caused the lock spring to be engaged so as to constrict the spring and lock the clutch in position.

These sorts of locking roller clutch mechanisms are very popular; however, they suffer from one serious drawback. When larger or heavier blinds are used in combination with these clutch mechanisms, the locking springs have a tendency to partially seize up, causing the clutch mechanisms to partially lock onto the barrel of the housing and resist the raising and lowering of the blinds. As a result, these clutch mechanisms do not always support the smooth and light weight operation. An improved clutch mechanism which incorporates a locking mechanism which does not stick or partially seize is therefore desirable.

SUMMARY OF THE INVENTION

In accordance with one aspect of the present invention, there is provided an improved roller blind clutch assembly for controlling the raising and lowering of a roller blind which permits the smooth raising and lowering of roller blinds even if the blinds are heavy. The improved roller blind clutch assembly includes a roller tube mount coaxially and rotatably mounted to a barrel. A clutch member is in turn coaxially and rotatably mounted to the barrel between the roller tube mount and the barrel. The clutch member has a window formed between a first and a second edge of the clutch member. A torsion locking spring is coaxially mounted to the barrel between the barrel and the clutch member. The torsion locking spring has opposite first and second ends which project into the window. The roller tube mount has an extension portion configured to extend into the window and dimensioned to fit between the first and second ends of the torsion locking spring. The extension has opposite first and second shoulders covered by a steel shim configured to fit between the extension and the torsion locking spring. The extension portion is also dimensioned and configured to maintain a gap between the extension and the torsion locking spring; thereby permitting the torsion locking spring from catching on the barrel as the clutch mechanism is used to raise and lower the blind.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

In the drawings like characters of reference indicate corresponding parts in the different figures.

DETAILED DESCRIPTION OF THE INVENTION

Figure 1:
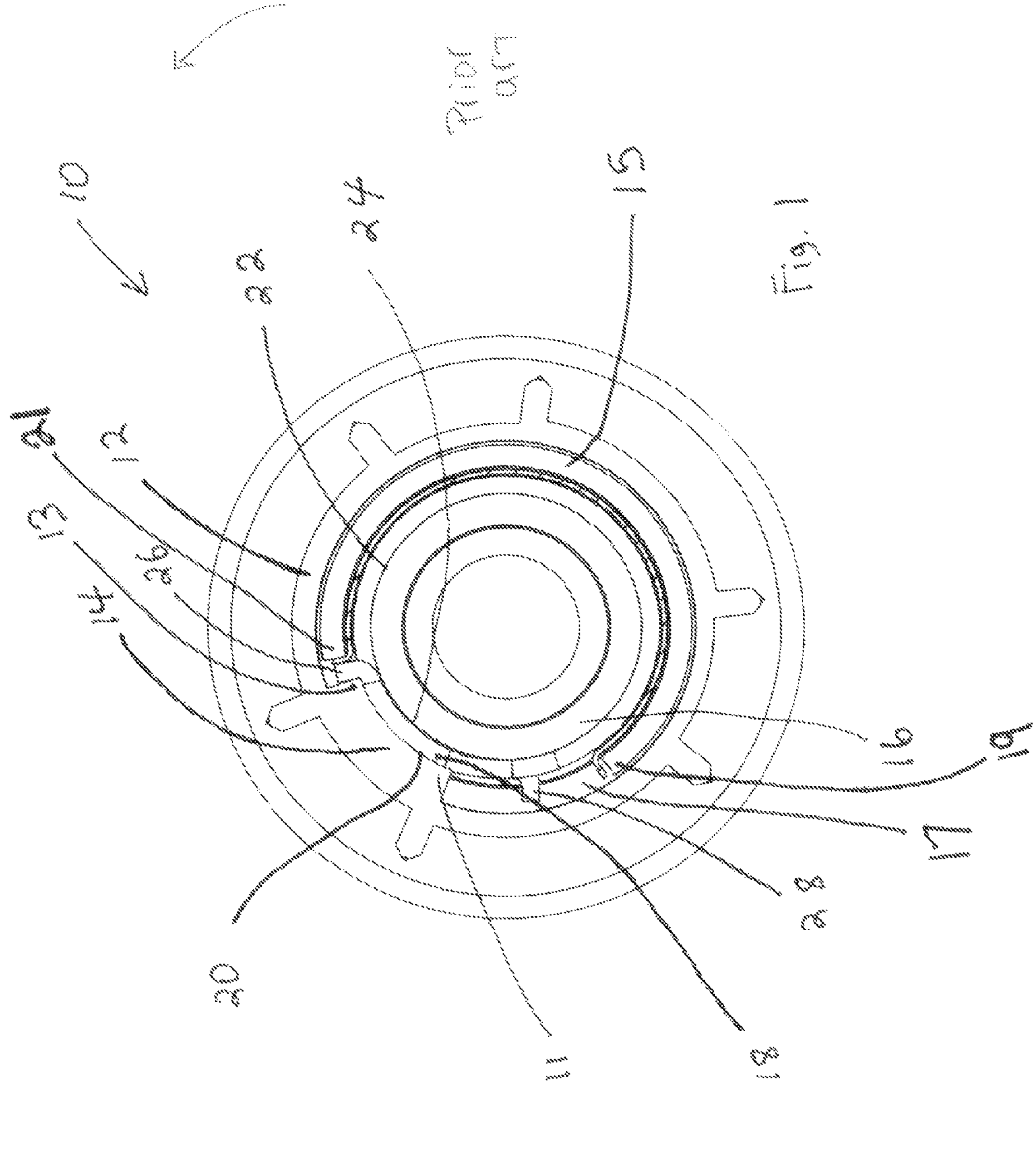
FIG. 1. is a cross sectional view of a prior art roller clutch assembly showing the roller tube, roller tube housing and clutch spring as the clutch is being engaged to raise a roller blind.

Referring firstly to FIG. 1, prior art roller clutch assemblies, shown generally as item 10, consist of a barrel 16 mounted within a roller tube mount 12 with a lock spring 18 positioned between them. Lock spring 18 has ends 26 and 28. Roller tube mount 12 has extension 14 which projects towards barrel 16. Extension 14 is dimensioned to fit between ends 26 and 28 and has shoulders 11 and 13 which are configured to engage one of the ends of lock spring 18 when the roller tube mount is rotated relative to barrel 16. When one of the ends of lock spring 18 is engaged from between ends 26 and 28, the spring decreases in diameter causing it to tighten onto barrel 16 and effectively lock the spring to the barrel preventing further movement of the roller tube mount relative to the barrel. This prevents the roller tube mount from accidentally rotating as a result of the weight of the blind (not shown) attached to the roller tube (not shown) which is coaxially mounted to the roller tube mount. A tubular clutch member 15 is coaxially mounted between barrel 16 and roller tube mount 12 and has a window (opening) 17 spanning ends 19 and 21 of the clutch member. Extension 14 extends into window 17. Lock spring 18 is coaxially mounted to barrel 16 between clutch member 15 and barrel 16. Window 17 is dimensioned to receive ends 26 and 28 of lock spring 18 such that the ends of the lock spring are positioned between ends 19 and 21 of the clutch member. Ends 19 and 21 of clutch member 15 are configured to engage one of the ends of the lock spring when the clutch member is rotated relative to barrel 16, which causes the lock spring to expand slightly in diameter, thereby loosening its grip on the barrel and permit the clutch and roller tube mount to rotate together as illustrated.

Extension 14 is a solid piece of plastic which is dimensioned to ensure that it can withstand the stresses caused by engaging ends 26 and 28 of torsion spring 18 as the clutch mechanism is used to raise and lower a blind (not shown). As a result of this requirement, extension 14 has concave surface (face) 20 which is configured to conform closely to spring 18 in order to make extension 14 as thick and robust as possible. Concave surface 20 will have a circular diameter defining the curvature of the concave face. To ensure that the concave surface (face) conforms closely to spring 18, the circular diameter of the concave face will be the same as the outside diameter of spring 18. It has been discovered that the thickness of extension 14 caused by the curvature of concave face (surface) 20 causes spring 18 to contact the outer surface 22 of barrel 16 adjacent extension 14 at point 24. This contact causes resistance to the relative rotation of the barrel and the rest of the clutch. As a result of this contact, the clutch becomes more difficult to turn, particularly when heavier blinds are coupled to roller tube mount 12.

Figure 2:
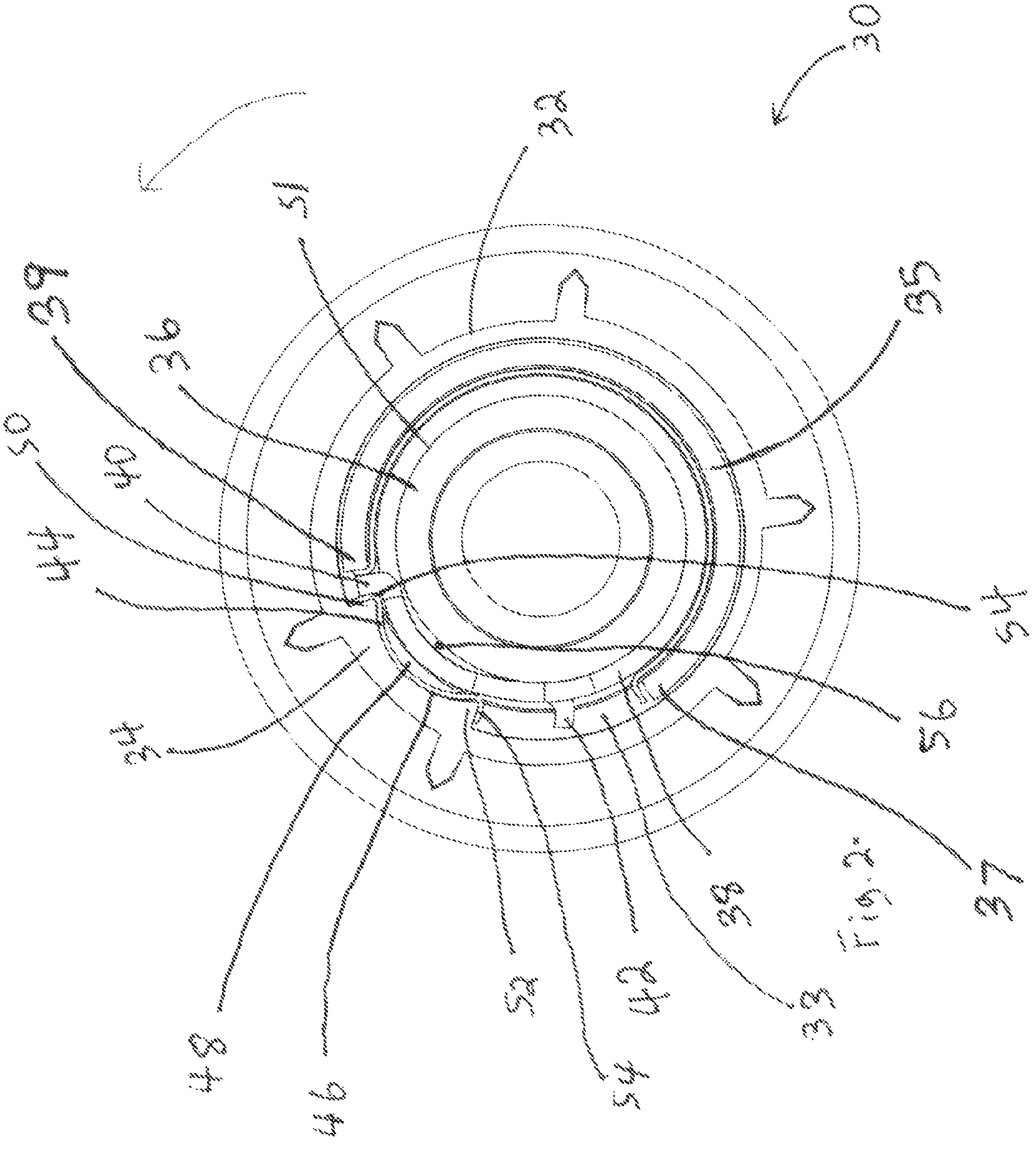
FIG. 2. is a cross sectional view of a roller clutch assembly made in accordance with the present invention being engaged to raise a roller blind.

The improved roller clutch assembly made in accordance with the present invention is shown generally in FIG. 2 as item 30 and includes a barrel 36, roller tube mount 32, clutch member 35 and lock spring 38 mounted between the clutch member and the barrel. Clutch member 35 has window 33 formed thereon between ends 37 and 39. Roller tube mount 32 has extension 34 having concave face 46 which is dimensioned to retain steel shim 44 between shoulders 50 and 52. Steel shim 44 has ends 54 which are dimensioned to conform closely to shoulders 50 and 52. Extension 34 is relatively thin, permitting concave face 46 and steel shim 44 to be shaped such that space 48 is formed between the steel shim and spring 38, which in turn leave room for gap 56 positioned between spring 38 and outer surface 51 of barrel 36. Preferably, concave face 46 has a circular diameter which is smaller than the outside diameter of spring 38. This ensures that gap 48 will always be present between extension 34 and spring 38, regardless of the stresses placed on the clutch. Steel shim 44 permits extension 34 to be relatively thin so as to allow for the formation of gaps 48 and 56 while still preventing ends 40 and 42 of spring 38 from digging into and damaging extension 34 even when heavy weight blinds (not shown) are mounted to roller tube mount 32.

Figure 3:
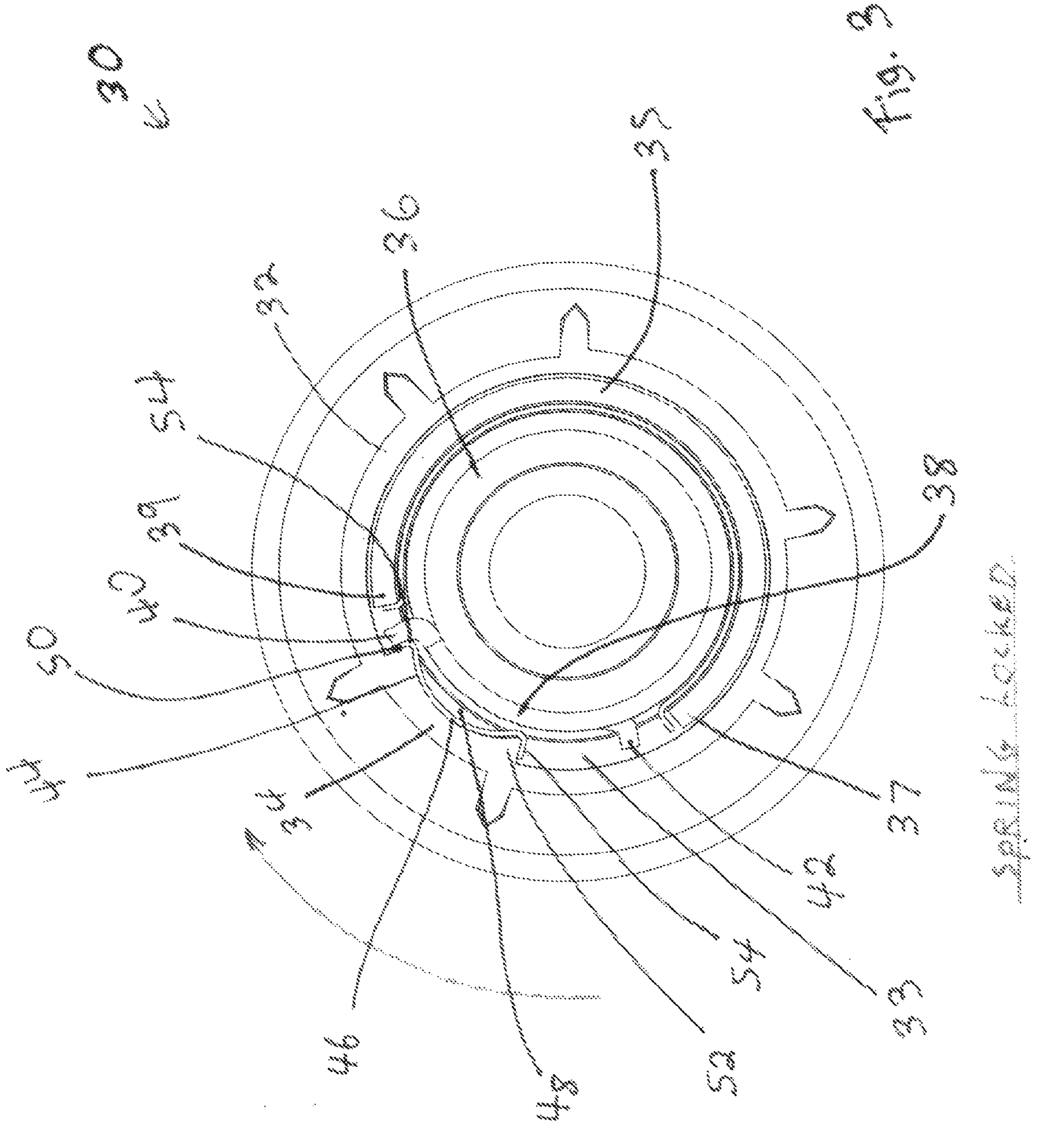
FIG. 3. is a cross sectional view of the roller clutch assembly made in accordance with the present invention being in a locked position with the weight of a blind acting on it.
Figure 4:
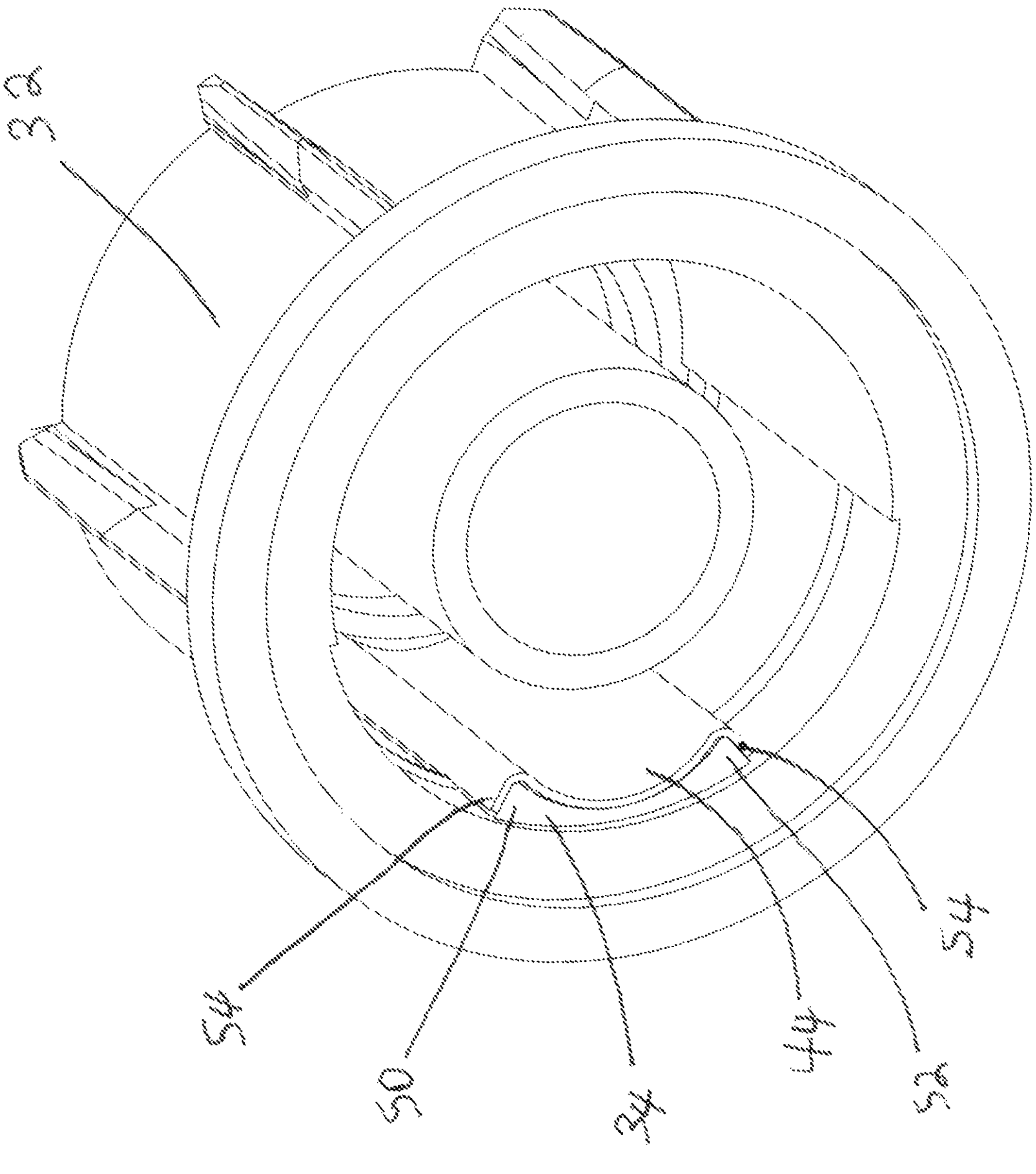
FIG. 4. is a perspective view of a portion of the roller clutch assembly made in accordance with the present invention showing the steel shim portion mounted to the roller tube housing.

Referring now to FIG. 3, ends 40 and 42 of spring 38 are engaged by steel shim 44 when roller tube mount 32 is urged to rotate relative to barrel 36 by the weight of a blind (not shown) acting on the roller tube mount. This in turn causes the lock spring to tighten onto barrel 36 thereby locking the clutch and preventing further rotation of the roller tube mount. Heavy weight blinds will not cause damage to shoulders 50 and 52 of portion 34 because steel shim 44 protects the ends. Hence, despite the fact that However, when clutch member 35 is rotated about barrel 36, as shown in FIG. 2, and end of clutch member 35, in this case end 39, engages an end of lock spring 38, in this case end 40, causing the lock spring to loosen its grip on barrel 36 which permits the clutch member to rotate with roller tube mount 32 permitting the roller tube mount to in turn lower or raise the blind (not shown). Because gap 48 is formed between extension 34 and lock spring 38, the portion of lock spring 38 adjacent extension 34 does not bear against barrel surface 51, thereby permitting a smoother and easier operation of the clutch.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

Therefore, what is claimed is:

1. A roller blind clutch assembly for controlling the raising and lowering of a roller blind, the clutch assembly comprising:

a roller tube mount coaxially and rotatably mounted to a barrel;

a clutch member coaxially and rotatably mounted to the barrel between the roller tube mount and the barrel, said clutch member having a first window formed between a first and a second edge of the clutch member;

a torsion locking spring having an outside diameter, said torsion locking spring being coaxially mounted to the barrel between the barrel and the clutch member, the torsion locking spring having opposite first and second ends projecting into the first window such that the first and second ends of the torsion locking spring are both between the first and second edges of the clutch member;

the roller tube mount having an extension portion configured to extend into the first window, the extension portion having opposite first and second shoulders, the extension dimensioned such that the first and second shoulders both fit between the first and second ends of the torsion locking spring within the first window, and the extension portion having a concave face extending between the first and second shoulders, said concave face having a circular diameter less than the outside diameter of the torsion locking spring to form a gap between the extension and the torsion locking spring.

2. The roller blind clutch assembly of claim 1 further comprising a steel shim mounted to the extension portion, said steel shim having a concave profile corresponding to the concave face, said steel shim further including opposite first and second ends configured to conform to the first and second shoulders of the extension portion, respectively.

3. The roller blind clutch assembly of claim 2 wherein the reinforcing shim further includes opposite first and second ends configured to fit over the first and second shoulders of the extension portion, respectively, said reinforcing shim having a profile closely conforming to the extension portion.

4. The roller blind clutch assembly of claim 1 wherein first and second shoulders are in close proximity to the torsion locking spring with the concave face between the first and second shoulders being spaced further away from the torsion locking spring.

* * * * *